Patented Aug. 18, 1931

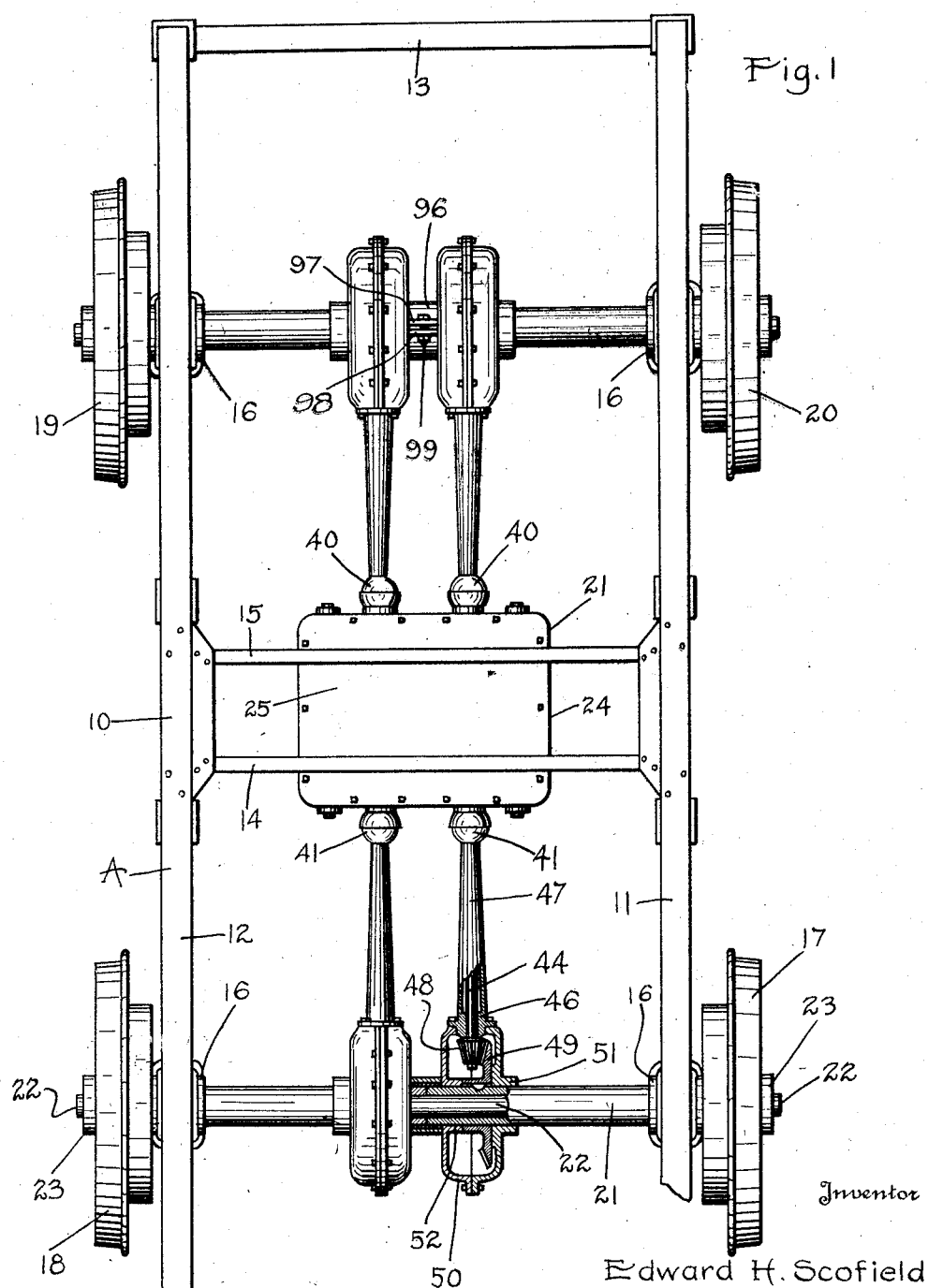

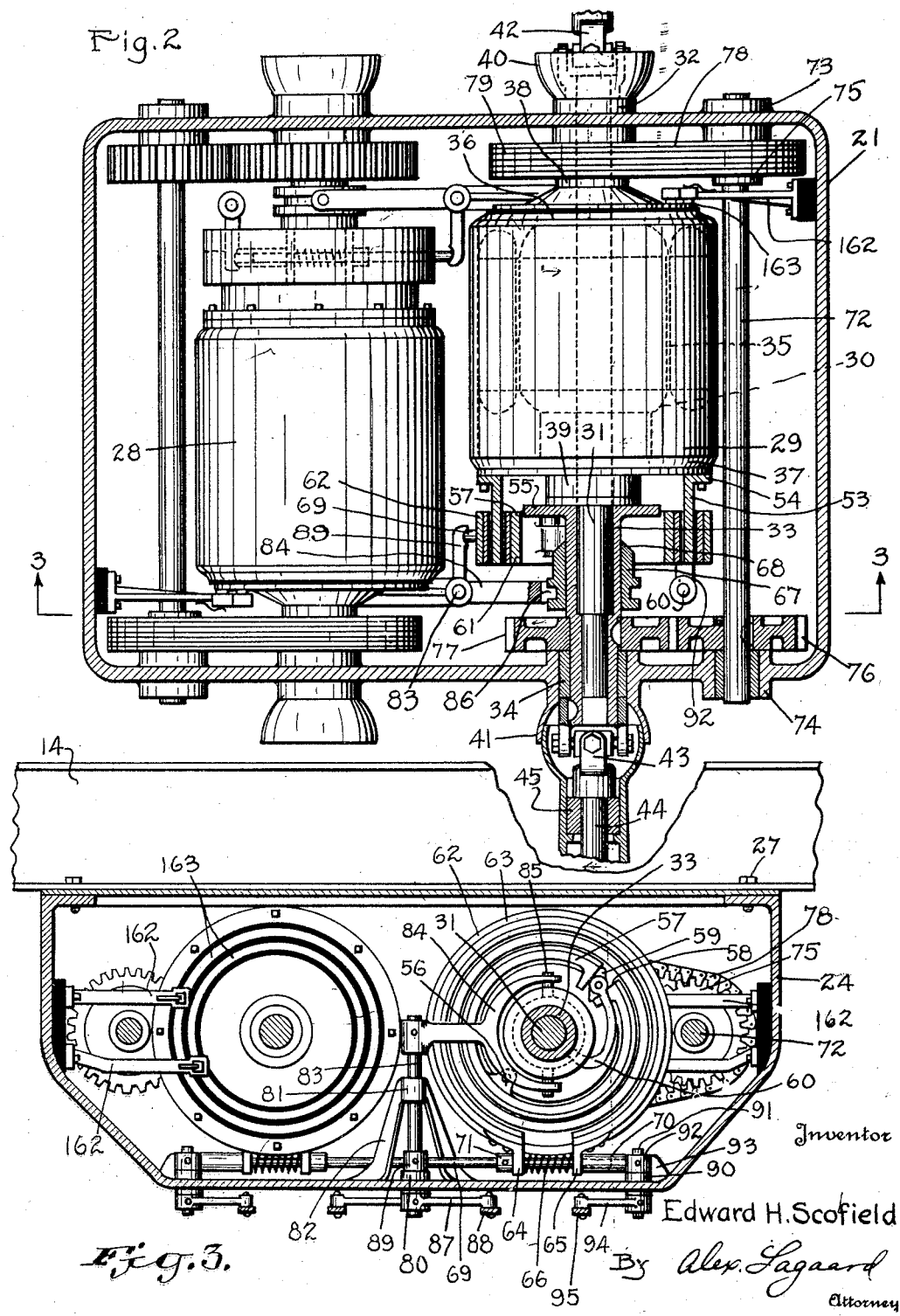

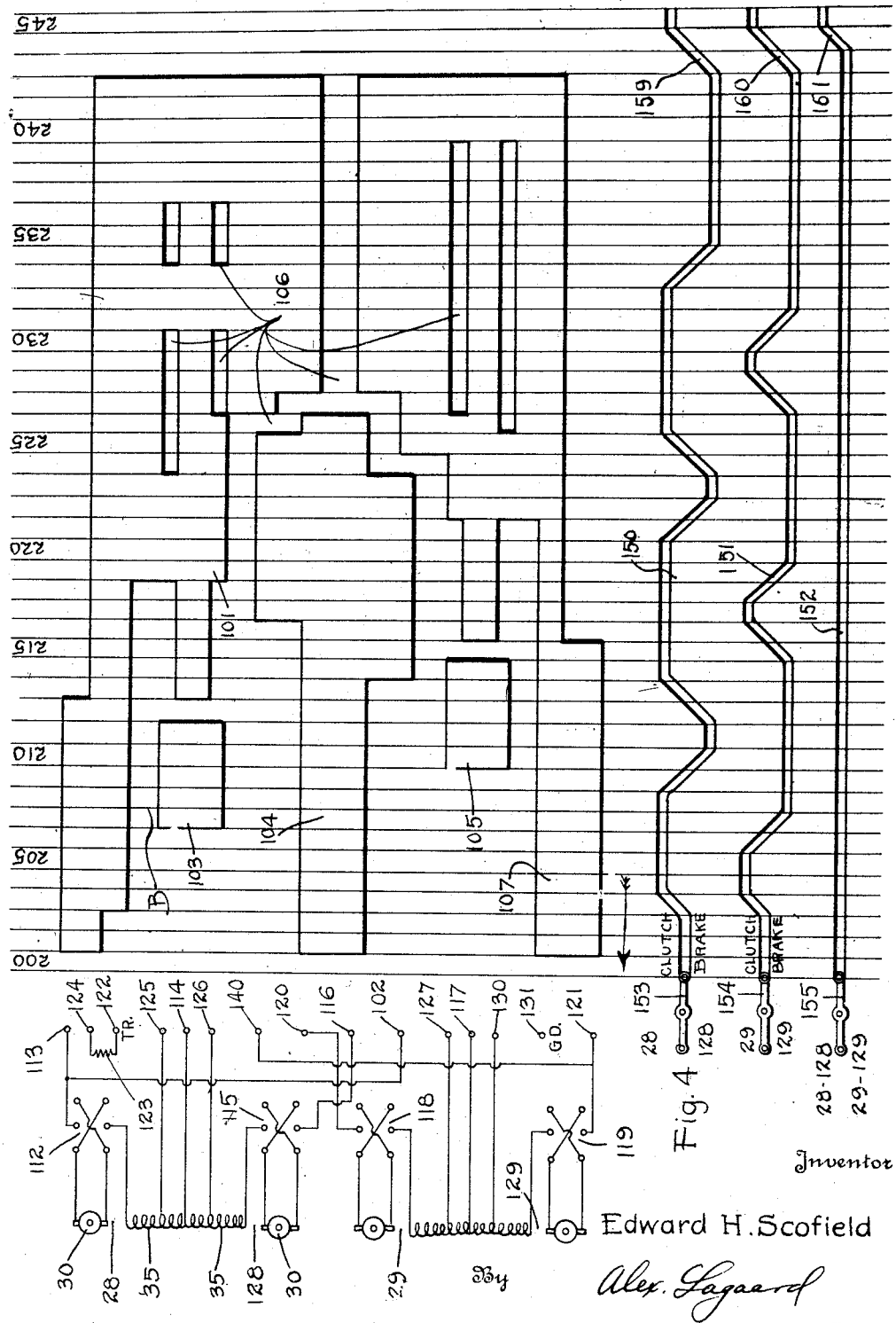

1,819,626

UNITED STATES PATENT OFFICE

EDWARD H. SCOFIELD, OF MINNEAPOLIS, MINNESOTA

POWER TRANSMISSION DEVICE

Application filed February 13, 1928. Serial No. 253,995.

My invention relates to power application and transmission devices for motor vehicles, and particularly to electrical power devices used in conjunction with street railway cars.

An object of the invention resides in providing a power transmission device in which an electric motor having two rotatable elements is employed, each element of said motor being connected to the wheels of the car truck so as to operate the car at half the usual speed.

Another object of the invention resides in arranging said motor so as to permit of arresting the rotation of one of said elements so as to double the initial speed of the car by said motor.

Another object of the invention resides in providing the field of said motor with a clutch and a brake adapted to disconnect the field from the wheels of said car and to arrest the movement of the same.

A feature of the invention resides in connecting one of the rotating elements of the motor to one of the front wheels of said truck and the other of said rotating elements of said motor to the trailing rear wheel on the same side of the truck and to provide a drive between said wheels serving as an interlock therebetween and to drive both the said wheels from one of said rotating elements when the other is held from rotation.

Another feature of the invention resides in providing similar motor equipment for the other wheels of the truck and in yieldingly connecting both the front pair and rear pair of wheels so as to permit of differential movement of said wheels in the passage of the car around a curve.

Another object of the invention resides in providing means for operating said clutch and brake alternately so as to prevent the application of said brake to said field while the clutch is connected therewith.

A feature of the invention resides in providing auxiliary operating means in conjunction with said brake for setting the same when the field is in driving relation with said clutch to serve as an emergency brake for arresting the movement of the car.

A feature of the invention resides in entirely disconnecting the heavier of said rotatable elements from the wheels or interlock drive thereof through said clutch so as to allow the motor to idle when the car is at a standstill, thereby making it possible to utilize the momentum of said element in accelerating the car.

Another object of the invention resides in providing a transmission system whereby acceleration may be procured in suitable steps without the employment of resistances in the electrical control so as to greatly increase the efficiency of the power unit.

With the foregoing and other objects in view, which will appear in the following description, the invention resides in the novel combination and arrangement of parts and in the details of construction hereinafter described and claimed.

In the drawings:

Fig. 1 is a plan view of the chassis of one of the trucks of a street railway car illustrating the application of my invention thereof.

Fig. 2 is a plan sectional view of the motor equipment illustrated in Fig. 1 taken immediately below the cover of the motor housing and drawn to an enlarged scale.

Fig. 3 is an elevational sectional view taken on line 3—3 of Fig. 2.

Fig. 4 is a diagrammatic view illustrating the manner of making electrical connections and the manner of operating the clutches and brakes of my improved power transmission device including a diagram of the controller proper used in conjunction therewith.

For the purpose of illustrating my invention, I have shown in Fig. 1 the chassis of a motor truck A forming one of the two trucks of an ordinary railway car. This truck comprises a frame 10 having longitudinal frame members 11 and 12 connected by end frame members 13 and intermediate frame members 14 and 15. These frame members are provided with springs which carry suitable bearings 16 journaling the wheels of the truck which are indicated at 17, 18, 19 and 20. Each of these wheels is formed with a tubular axle 21 which is securely attached to the wheel proper and is journaled in the respective bearing 16. These axles extend toward one another and meet in the center of the frame A. Within these tubular axles is disposed a shaft 22 which extends completely through the same and has attached to the end thereof collars 23 which hold the axles in proper relation and assist in taking up the end thrust occasioned in the travel of the truck. The power transmission system of the truck includes two electric motors 28 and 29 which are housed within a case 24 centrally disposed relative to the truck. This case is provided with a suitable cover 25 and is bolted to the frame members 14 and 15 by means of bolts 27.

Each of the motors 28 and 29 being identical in construction only motor 29 will be described in detail. This motor comprises an armature 30 formed with an armature shaft 31 extending outwardly beyond the same at both ends thereof. The shaft 31 is directly journaled in a bearing 32 formed in the case 24 and has rotatably mounted upon the other end thereof a revoluble member 33 which in turn is journaled in a bearing 34 formed on the opposite side of said case which in conjunction with the bearing 32 serves to rotatably support said armature shaft within said case. The motor 29 further consists of a field 35 constructed with end plates 36 and 37, which end plates are provided with bearings 38 and 39 which are rotatably mounted on the armature shaft 31, thereby journaling said field for rotation. With this construction it will be readily comprehended that both the field and armature rotate relative to the case 24 and relative to one another. Current is brought to the motor through brushes 162 and commutator rings 163.

Motor 28 is mounted adjacent motor 29 in case 24 and the two armature shafts thereof extend across said case in parallel relation. For driving the truck wheels 17, 18, 19 and 20 from the motors 28 and 29 I employ four propeller shafts 44 which terminate in universal joints 42 and 43. These shafts are disposed within tubular housings 47 while said universal joints are enclosed within universal housings 40 and 41 secured to said tubular housings and to said case adjacent the bearings 32 and 34. The universal joints 42 are connected to the two armature shafts 31 of motors 28 and 29, while the universal joints 43 are connected to the revoluble members 33 rotating upon the ends of the armature shaft 31. A field 35 of each of motors 28 and 29 may be connected to said revoluble members as will be presently explained so that one set of wheels are driven from the armatures of said motors and the other set of wheels may be driven from the field of said motors when the motors function in their normal manner.

The method of driving the various wheels of the truck is best illustrated in Fig. 1, which being the same for all wheels only the drive for wheel 17 will be described in detail. The propeller shaft 44 previously referred to which is directly connected to the universal joint 43, is journaled in bearings 45 and 46 formed in the propeller shaft housing 47. This shaft has secured to the end thereof a bevel pinion 48 which meshes with a bevel gear 49 fast on the tubular axle 21 of wheel 17. A gear housing 50 rotatably mounted on the tubular axle 21 through bearings 51 and 52 is connected to the propeller shaft housing 47 and completely encloses both the gears 48 and 49. In like manner all of the other wheels are similarly driven from the respective armatures and fields of the two motors 28 and 29.

The construction for connecting the field of motor 29 with the revoluble member 33 is best shown in Figs. 2 and 3. A sleeve-like extension 53 formed with a flange 54 is bolted to the end plate 37 of the motor. This sleeve surrounds a portion of the revoluble member 33 which is constructed with a flange 55 at its inner end. Upon this flange is pivotally mounted through a pin 56 an expansible ring-like member 57 which is split at one end, as indicated at 58 in Fig. 3. A cam 59 disposed between the split portion 58 of said ring and operable through a finger 60 serves to spread the ring apart and causes the same to engage the inner surface of the sleeve 53 so as to effect a drive between said sleeve and said revoluble member. Finger 60 is operated through a sliding collar 67 which is mounted upon the revoluble member 33 and is formed with a cam portion 68 adapted to engage the end of the finger 60 and to force the same radially outwardly so as to actuate cam 59 and spread the ends of ring 57 apart. This construction forms a clutch which I have indicated in its entirety at 61 whereby the universal joint 43 may be driven from the field 35 of motor 29 or disconnected therefrom at will.

In conjunction with the clutch 61 I employ a brake for the field 35 indicated at 62. This brake consists of a brake band 63 terminating in spaced lugs 64 and 65 issuing outwardly from the surface of said brake and separated by a compression coil spring 66. A rod 69 is slidably mounted in the lugs 64 and 65 and in a sleeve 70 which may be held immovable in a manner to be presently described in detail and carries a collar 71 which is rigidly secured thereto. The sleeve 70 engages the lug 65 while the collar 71 similarly engages the lug 64. Upon reciprocation of rod 69 in the direction of the lug 65 the brake band 63 may be drawn together to clamp upon the surface of the sleeve 53 and arrest the motion of the field 35 of motor 29.

For the purpose of forming an interlock between the trailing wheels of the truck and for driving the wheels when the motors are set for high speed operation I employ an auxiliary drive best shown in Figs. 2 and 3. One such drive is employed in conjunction with each of the motors 28 and 29 and only that used with motor 29 will be described in detail. This drive comprises a shaft 72 which is journaled in bearings 73 and 74 formed in the motor case 24. This shaft carries at one end a sprocket wheel 75 and at its other end a spur gear 76. The spur gear 76 meshes with a corresponding spur gear 77 fast on the revoluble member 33 while a chain 78 passes over the sprocket wheel 75 and a corresponding sprocket wheel 79 fast on the armature shaft 31. The armature shaft 31 being permanently connected by a positive drive to one of the wheels of the truck and the revoluble member 33 being similarly connected to another wheel of the car, it will become readily apparent that these wheels become mechanically interlocked through the gears 76 and 77 and the sprocket chain 78 and the sprocket wheels 75 and 79.

With the particular construction of my invention, the motor proper can be caused to operate the driving wheels of the truck at two different speeds without altering the operating characteristics of the motors or without shifting gears. This is accomplished as follows: In starting, both the clutch 61 and the brake 62 are released permitting the field 35 to rotate freely. Upon energizing the motor the armature 30 being fast to one of the wheels remains stationary while the field 35 quickly gains its idling speed. If after the motor has come up to speed the clutch 61 be gradually engaged a drive is effected between the field 35 and the wheel 17 with which the revoluble member 33 is connected. As soon as the clutch 61 is fully engaged both the armature 30 and field 35 of motor 29 rotate relative to the case 24 and relative to one another. It will, however, be noted that the field and armature rotate in opposite directions relative to the case 24 and at half the speed relative to said case as compared with the rotation relative to one another. This causes the car wheels to rotate at one-half the speed that they would ordinarily rotate were the motors directly connected in the usual manner thereto. By disengaging the clutch 61 and applying the brake 62 the field 25 of motor 29 can be caused to come to rest. This causes the armature 30 to speed up and the wheels of the truck to be driven approximately at twice the speed at which they were driven when the clutch 61 was engaged and the brake 62 free. When the brake 62 is set the interlock between the trailing wheels serves to drive both sets of wheels from the armature shaft 31 as soon as the back lash in these gears has been taken up through slippage of the wheel directly connected to the said armature shaft.

In the normal operation of the device it is desirable that the clutch 61 be not engaged at the same time that the brake 62 is set, otherwise the motor 29 is completely stopped and is apt to be burned out. For this purpose I provide a control for operating simultaneously upon the brake and clutch. At the lower portion of the case 24 I form a bearing 80 and immediately above the same a bearing 81 which is mounted on a bracket 82 fast on said case. A vertically positioned shaft 83 is journaled in these two bearings and extends outwardly through the bottom of said case. Upon the upper end of this shaft is rigidly secured a shifter fork 84 which is formed with pins 85 adapted to operate within a groove 86 in the clutch collar 67. Upon oscillation of the shaft 83 the clutch 61 may be engaged or disengaged at will. A crank arm 87 secured to shaft 83 beneath the case 24 and having connected to the same a suitable link 88 operated from the cab of the car serves to control the operation of said device. In conjunction with the shifter fork 84 the shaft 83 has attached to it an arm 89 best shown in Fig. 2 which is situated in the plane of the rod 69 and is adapted to engage the extreme end of the same. This arm serves to force the rod 69 toward the sleeve 70 so as to move the lugs 64 and 65 together and to operate the brake. It will hence become readily apparent that the brake 62 may be set by operating the arm 87 in one direction and that the clutch 61 may be engaged by operating said arm in the opposite direction, and that the motor field may be allowed to idle when said arm is in an intermediate position.

If desired the clutch 61 and the brake 62 may be simultaneously applied when the current to the motor has been disconnected so as to utilize the same as an emergency brake. This is accomplished as follows: A bearing 90 formed on the underside of case 24 has journaled in it a short shaft 91 extending completely through the case. This shaft has secured to it an arm 92 similar to the arm 82 which engages the end of the sleeve 70 and which may upon oscillation of the shaft 91 force the lug 65 toward the lug 64 and effect the setting of the brake 62. The arm 92 normally abuts against a stop 93 formed in the case so that no strain is placed upon the shaft 91 during the normal operation of the device. A crank arm 94 similar to the arm 87 and connected by a link 95 similar to the link 88 serves to control the device from the cab of the car.

As has been previously stated, my transmission device consists of two separate units, one unit driving the wheels on one side of the car and the other unit driving the wheels on the other side of the car. If desired a single unit may be employed in which case differential drives for coupling the same with the co-axial pairs of wheels would be required instead of simple bevel gears. However, with the use of the two units the system may be accelerated to running speed without the use of resistances, as will presently be described. When so used, I employ in conjunction with each pair of co-axial wheels an equalizer for equalizing the torque on each wheel and for compensating for differences in speed of the wheels when the car is traveling around a curve. As will be noted in Fig. 1 and as previously brought out the tubular axles 21 extend toward the center of the truck and abut one another at a position disposed between the two gear housings 50. Upon the abutting ends of these tubular axles I mount a band 96 formed with lugs 97 and 98 similar to a brake band. These lugs may be drawn together by means of a bolt 99 so as to yieldingly connect the two tubular axles 21. In normal operation should one of the wheels lose its traction, torque will be transmitted through the equalizer 96 up to the frictional resistances offered by said equalizer so that spinning of the wheel without traction will be prevented. At the same time when the car travels over a curve the differences in speed of the two wheels is compensated for through said equalizer which allows relative rotational movement of the same when the torque therebetween exceeds the frictional resistance of said equalizer.

By means of the two speeds obtainable through the rotation of both field and armature and in the arresting of the field of the motors and in the use of two motors for each truck I am able to procure practically uniform acceleration in the starting of the car. This will become apparent from the wiring diagram shown in Fig. 4. As previously brought out the construction illustrated in the drawings shows but a single truck, two such trucks may be used for each car. In Fig. 4, the numerals 28, 29, 128 and 129 indicate the various motors on the two trucks of the car which are provided with armatures 30 and fields 35 as previously described.

At B I have indicated in diagrammatic form a controller, comprising a number of plates 101, 103, 104, 105 and 107 which are arranged upon the usual controller drum and operated in the customary manner. These plates are shown in developed form in Fig. 4, the same being illustrated with their circumferential direction running from right to left and their longitudinal direction running up and down. Insulation indicated at 106 separates said plates and portions thereof. These plates when the controller drum is rotated are adapted to contact with a number of contacts or fingers illustrated immediately to the left of the respective plates 101, 104 and 107 which are connected to the motors, as will be presently explained.

The armature 30 and field 35 of motor 28 are connected in series through a reversing switch 112 to contacts 113 and 114 of the controller B. Motor 128 is similarly connected through a reversing switch 115 to contact 114 and to another contact 116. This leaves the two fields of motors 28 and 128 connected in series with the common connection connected to contact 114. Motors 29 and 129 are similarly connected, both of the fields being connected in series and to a common contact 117 while the respective armatures of these motors are connected through reversing switches 118 and 119 to contacts 120 and 121. In addition to the connection of the fields of the various motors to contacts 114 and 117 the fields are tapped at suitable localities and these taps connected to contacts 125, 126, 127 and 130 disposed on either side of the contacts 114 and 117. These contacts serve to short a portion of the fields of the various motors and to cause the motors to operate at a higher rate of speed. The trolley or live side of the line is connected to contact 122 while a starting resistance 123 is connected to said contact and an adjacent contact 124. Ground connection is had through contact 131. For the purpose of simplifying the controller construction to permit of changing the motors from series relation to parallel relation, the contacts 113 and 121 are connected to two other contacts 102 and 140 which complete circuits through the controller plates as will be presently explained.

To simplify the explanation of the operation of the controller the drum has been divided into forty-seven circumferential sections, designated 200 to 247 inclusive, and illustrated by light vertical reference lines.

In the operation of the device acceleration of the car is produced as follows: When the controller is rotated and so as to bring the various contacts at the circumferential position indicated at 201, contacts 120 and 116 are connected together and the trolley is connected through resistance 123 and the ground connection through plate 107. All of the motors are then connected in series. This single resistance is the only resistance employed with my car transmission device and is only utilized for the purpose of bringing the motor up to idling speed from rest. The further rotation of the drum B in the direction of the arrow shorts the resistance 123 when the contacts reach the position 203.

Up to this point the motors have been running idle and in series and the car is stationary. At this position levers 153 and 154 are shifted by means of cams 150 and 151 and from neutral to low speed bringing the car up to its lowest running speed. At position 205 the car is traveling at its lowest speed, all of the motors being in series. At position 214 two of the motors are connected in parallel and these two are connected in series with the remaining two in series. At 217 two of the motors are connected in parallel, the other motors being likewise connected in parallel and the two sets of motors connected in series. At position 225 one of the motors is connected in series with the other two in parallel between trolley and ground, while the fourth motor is directly connected between trolley and ground. At position 228 all four motors are connected in parallel.

In addition to the connection of the motor in various combinations of series in parallel, I employ the two speeds attainable through the use of both rotating armature and rotating field for speeds intermediate of those above specified. Further examination of the controller diagram illustrated in Fig. 4 will show that the two motors are successively shifted from low to high speed and vice versa at various positions on the controller drum through the manipulation of the levers 153 and 154. The changing of the motor speeds by this means is accomplished at intervals intermediate the various electrical connections of the motors so that the steps in the acceleration of the car are more nearly equal and are smaller than would be possible were the connecting of the motors in different electrical relations solely relied upon. It will be further noted that the shifting of the two sets of motors from one speed to the other does not occur at the same time which further aids in reducing marked variations in acceleration. In conjunction with these two means for changing the speed of the motors the speeds are further altered by shorting some of the field turns on each of the motors and again in cutting in all of the field turns. Such operations are carried out in conjunction with the altering of the speeds of the motors as well as the connecting of the same in various electrical relations so that a regular and smooth acceleration of the car is produced. It will be noted by inspection of Fig. 4 that where the increase in speed of one set of motors is relatively greater than that procured by the preceding step that the corresponding increase in speed of the other motor is made proportionately less so that the average increase of speed does not appreciably vary with respect to that desired for the preferred acceleration. In certain instances where the increase of speed due to the changing of the speed of the motors through the arresting rotation of the fields thereof is too great, the corresponding reduction in speed is secured by cutting in all of the field turns of such motors so that the resultant speed is more nearly equal to that desired.

For the purpose of operating the emergency brake accomplished by setting the brakes 62 and throwing the clutches 61 at the same time, the cams 150 and 151 are provided with portions 159 and 160 for throwing the levers 153 and 154 in such manner as to bring clutches 61 into operative position. These clutches being simultaneously connected to the brakes 62 the same are automatically disengaged. Setting of said brakes is accomplished by means of the lever 155 and the cam 152 which is formed with a portion 161 operating at the same time as the portions 159 and 160 of cams 150 and 151 so that levers 153, 154 and 155 are simultaneously operated to set the brakes when both armature and field are connected to the driving wheels. In this manner the motors are automatically utilized as emergency brakes. It will be noted in Fig. 4 that all contact with the motors through the various contact fingers are open so that current has been cut off from the motors and danger of burning out the motors through the application of the brake is completely prevented. As shown in the drawings the emergency brake is caused to be set by turning the controller drum beyond the normal high speed position. If desired the cam portions 159, 160 and 161 can be arranged at the portion indicated at 200 at the low speed portion of the drum so that the emergency brake may be operated from either extreme position of the drum. Where the controller plates extend about the entire periphery of the drum positions 200 and 245 will be coincident.

Although I have not shown the particular controller construction whereby the various steps are utilized in accelerating the car from rest to normal running position, yet it can readily be comprehended that controls of such type as are now in common use may be utilized for this purpose by merely changing the plates on the drums to conform to the construction shown in Fig. 4. It may be further stated that suitable cams having surfaces corresponding to those illustrated at 150 and 151 may be mounted on the controller shaft for operating the levers 153, 154 and 155 so that the operation of the car is fully automatic. It may be further comprehended that a small motor may be used for rotating the controller drum entirely eliminating manual operation so that the motorman need only press a push button or some other simple switch controlling the circuit operating such motor.

My invention is particularly advantageous in that it provides a positive and effective device for driving a car by means of which numerous speeds may be readily had without the employment of resistances for controlling the current to the motors. In starting, the motors are first brought up to speed while idling, thereby reducing the usual rush of current in the accelerating of the car when the current is first thrown on the motors. In addition, the idling elements of the motors when idling revolve so as to cool the motors and so that the rotational momentum of the same may be utilized to assist in overcoming the inertia of the car in accelerating the same. With the particular type of motor employed, considerable reduction in the weight of the motor occurs for the same maximum driving speed or an increased speed can be procured with the same weight of motor as is customarily employed. Likewise higher acceleration may be had with the same power input. The period of acceleration with my improved power transmission device can be considerably reduced, particularly, at the beginning of such period. With each motor, driving the wheels on one side of the truck and with the interconnection between the co-axial wheels and interlocking between trailing wheels a drive is procured which is extremely effective in preventing loss of traction due to slippage of any of the wheels. With the wheels on each side of the truck operated through separate motors, the differential action between the long radius and the short radius wheels is automatically secured which is absorbed in the difference in current consumption of the two motors. By means of the equalizer connecting the co-axial wheels, spinning of wheels due to loss of traction is further prevented up to the capacity of such equalizer. By simultaneously throwing in the clutch and setting the motor brakes an emergency braking system is secured which operates on all of the wheels of the trucks and serves to stop the car in a minimum length of time.

Changes in the specific form of my invention, as herein disclosed, may be made within the scope of what is claimed without departing from the spirit of my invention.

Having described my invention, what I claim as new and desire to protect by Letters Patent is:

1. In combination, a support, a pair of driven members revoluble relative to said support, a power transmission device having two elements revoluble relative to one another and to said support, one for driving each driven member, said power transmission elements having fixed operating characteristics relative to one another, means for arresting the rotation of one of said elements to increase the speed of the other relative to said support, and means for driving one of said driven members from the other revoluble element.

2. In a propulsion system for vehicles having a frame and front and rear wheels journaled relative thereto, a power transmission device comprising two revoluble elements revoluble relative to one another and to said frame, said elements having fixed operating characteristics relative to one another, one of said elements being connected to one of said front wheels and the other of said elements being connected to the trailing rear wheel, means for disconnecting one of said revoluble elements from its corresponding wheel, means for arresting the rotation of said disconnected element to increase the speed of the other element, and a mechanical drive between said front wheel and trailing rear wheel forming an interlock therebetween.

3. A power transmission device for motor vehicles comprising a frame and an electric motor mounted thereon having both the armature and field thereof rotatable relative to one another and to said frame, the armature of said motor being connected to one of the wheels of the motor vehicle and the field of said motor vehicle being connected to another of the wheels of said motor, means for disconnecting the field of said motor from its respective wheel, means for arresting the rotation of said field to increase the speed of said armature relative to said frame, and a drive between said wheels adapted to form an interlock therebetween, for driving said field driven wheel from said armature upon the disconnection of said field therefrom.

4. A power transmission device for motor vehicles comprising a frame, a pair of electric motors mounted on said frame, each having an armature and field, the armature and field of each motor being both revoluble relative to one another and to the frame, the armature and field of one motor being arranged to drive the front wheel and trailing rear wheel on one side of the motor vehicle, and the armature and field of the other motor being arranged to similarly drive the front and trailing rear wheel on the other side of the motor vehicle, a drive between the wheels on one side of said motor, a second drive between the wheels on the other side of said motor, and a yielding connection between one pair of said wheels and accommodating differential movement of the wheels on opposite sides of said motor vehicle.

5. A power transmission device for motor vehicles comprising a frame, a pair of electric motors mounted on said frame, each having an armature and field, the armature and field of each motor being both revoluble relative to one another and to the frame, the armature and field of one motor being arranged to drive the front wheel and trailing rear wheel on one side of the motor vehicle, and the armature and field of the other motor being arranged to similarly drive the front and trailing rear wheel on the other side of the motor vehicle, a drive between the wheels on one side of said motor, a second drive between the wheels on the other side of said motor, and a yielding connection between one pair of said wheels and accommodating differential movement of the wheels on opposite sides of said motor vehicle, means for driving one of said wheels of said motor vehicle from the armature shaft of one of said motors, a revoluble member concentrically journaled relative to said armature shaft, a sleeve attached to the field of said motor extending towards said revoluble member, a clutch mounted on said revoluble member and adapted to engage said sleeve for driving said revoluble member from said field, means for driving another wheel of said motor vehicle from said revoluble member, and a brake adapted to engage said sleeve for holding said field from rotation relative to said frame.

6. A power transmission device for motor vehicles comprising a frame, a pair of electric motors mounted on said frame, each having an armature and field, the armature and field of each motor being both revoluble relative to one another and to the frame, the armature and field of one motor being arranged to drive the front wheel and trailing rear wheel on one side of the motor vehicle, and the armature and field of the other motor being arranged to similarly drive the front and trailing rear wheel on the other side of the motor vehicle, a drive between the wheels on one side of said motor, a second drive between the wheels on the other side of said motor, and a yielding connection between one pair of said wheels and accommodating differential movement of the wheels on opposite sides of said motor vehicle, means for driving one of said wheels of said motor vehicle from the armature shaft of one of said motors, a revoluble member concentrically journaled relative to said armature shaft, a sleeve attached to the field of said motor extending towards said revoluble member, a clutch mounted on said revoluble member adapted to engage said sleeve for driving said revoluble member from said field, means for driving another wheel of said motor vehicle from said revoluble member, a brake adapted to engage said sleeve for holding said field from rotation relative to said frame, and means for alternately operating said clutch and brake.

7. A power transmission device for motor vehicles comprising a frame, a pair of electric motors mounted on said frame, each having an armature and field, the armature and field of each motor being both revoluble relative to one another and to the frame, the armature and field of one motor being arranged to drive the front wheel and trailing rear wheel on one side of the motor vehicle, and the armature and field of the other motor being arranged to similarly drive the front and trailing rear wheel on the other side of the motor vehicle, a drive between the wheels on one side of said motor, a second drive between the wheels on the other side of said motor, and a yielding connection between one pair of said wheels and accommodating differential movement of the wheels on opposite sides of said motor vehicle, means for driving one of said wheels of said motor vehicle from the armature shaft of one of said motors, a revoluble member concentrically journaled relative to said armature shaft, a sleeve attached to the field of said motor extending towards said revoluble member, a clutch mounted on said revoluble member adapted to engage said sleeve for driving said revoluble member from said field, means for driving another wheel of said motor vehicle from said revoluble member, a brake adapted to engage said sleeve for holding said field from rotation relative to said frame, means for alternately operating said clutch and brake, and means operating in conjunction with said brake and setting said brake with said clutch in driving relation with said sleeve for holding said motor from rotation and retarding the movement of said vehicle.

8. In an electrical transmission system for railway cars including a plurality of motors for driving the car wheels, each motor having an armature and a field, both revoluble, means for arresting one to increase the speed of the other, and means for successively connecting the motors in series and multiple to further vary the speed of the motors.

9. In an electrical transmission system for railway cars including a plurality of motors for driving the car wheels, each motor having an armature and a field, both revoluble, means for arresting one to increase the speed of the other, and means for successively connecting the motors in series and multiple to further vary the speed of the motors, said arresting means and connecting means being operated in a predetermined order.

10. In combination, a support, a pair of driven members revoluble relative to said support, a motor having two elements, one a field and the other an armature, both revoluble, means for arresting the rotation of one of said elements to increase the speed of the other, and means for driving the driven member normally driven by the arrested motor element from the other motor element.

11. In combination, a support, a pair of driven members revoluble relative to said support, a power transmission device having two elements revoluble relative to said support, means for driving one of said driven members from one of said elements, means for selectively driving the other driven member from either element, and means for reducing the speed of the other of said elements.

12. In combination, a frame, a pair of driven members revoluble relative to said frame, driving means for simultaneously driving both of said driven members, said driving means affording a variable relative speed between said members, and means driven by said driving means affording a constant relative speed between said members.

13. A power transmission device comprising an electric motor having an armature and a field, both revoluble, a revoluble member concentrically disposed relative to said armature, a sleeve attached to said field, a band operating upon the exterior of said sleeve for arresting said field, and a clutch operating upon the interior of said sleeve for effecting a drive between said revoluble member and said field.

14. A power transmission device comprising an electric motor having an armature and a field, both revoluble, a revoluble member concentrically disposed relative to said armature, a sleeve attached to said field, a band operating upon the exterior of said sleeve for arresting said field, and a clutch operating upon the interior of said sleeve for effecting a drive between said revoluble member and said field, and means for alternately operating said band and clutch.

15. In an electrical transmission system including driven means, a plurality of motors, a drive between said motors and driven means, means for selectively connecting said motors in multiple and series to vary the speed thereof, and means for varying the speed ratio of said drive.

16. In an electrical transmission system including a support, driven means mounted thereon, a plurality of motors carried by said support each having an armature and a field, each revoluble relative to said support and to one another, means forming a mechanical drive between the armatures and fields of said motors and said driven means for operating said driven means at two rates of speed therefrom, means for effecting a driving connection between said drive and driven means at either of the rates of speed thereof, and means for connecting said motors in multiple and in series to vary the speed thereof conjointly with the varying of the speed through said drive.

17. An electric motor comprising a support, a shaft journaled in said support, an armature carried by said shaft, a field revoluble about said shaft and relative to said support, a revoluble member concentrically journaled relative to said shaft, a clutch adapted to engage said field for driving said revoluble member from said field, and a brake for interrupting the rotation of said field.

18. An electric motor comprising a support, a shaft journaled in said support, an armature carried by said shaft, a field revoluble about said shaft and relative to said support, a revoluble member concentrically journaled relative to said shaft, a clutch adapted to engage said field for driving said revoluble member from said field, a brake for interrupting the rotation of said field, and means for alternately operating said brake and clutch.

19. An electric motor comprising a support, a shaft journaled in said support, an armature carried by said shaft, a field revoluble about said shaft and relative to said support, a revoluble member concentrically journaled relative to said shaft, a sleeve attached to said field and extending toward said revoluble member, a clutch mounted on said revoluble member and adapted to engage said sleeve for driving said revoluble member from said field, and a brake adapted to engage said sleeve for holding said field from rotation relative to said support.

20. An electric motor comprising a support, a shaft journaled in said support, an armature carried by said shaft, a field revoluble about said shaft and relative to said support, a revoluble member concentrically journaled relative to said shaft, a sleeve attached to said field and extending toward said revoluble member, a clutch mounted on said revoluble member and adapted to engage said sleeve for driving said revoluble member from said field, a brake adapted to engage said sleeve for holding said field from rotation relative to said support, and means for alternately operating said clutch and brake.

In testimony whereof I have affixed my signature.

EDWARD H. SCOFIELD.